Patented June 13, 1950

2,511,725

UNITED STATES PATENT OFFICE 2,511,725

REFRACTORY CONCRETE AND METHOD OF MAKING

Frank E. Lobaugh, South Plainfield, N. J., assignor to Universal Atlas Cement Company, a corporation of Indiana No Drawing. Application September 5, 1946, Serial No. 695,034

13 Claims. (Cl. 106—64)

This invention relates to an improved refractory, more particularly a refractory concrete of which an essential component is calcium silicate cement.

Among the objects of the invention is the provision of an improved refractory composition yielding articles such as refractory structures and shapes of improved strength at elevated temperatures, and of the refractory shapes resulting from such composition.

A further object of the invention resides in the method by which the improved refractory structures and shapes composed of such improved refractory composition are made.

These and further objects of the invention will be more readily apparent in the following description of preferred modifications of the invention.

The present invention represents improvements in certain aspects of the teachings of Kocher Patent No. 2,416,701, issued March 4, 1947. It involves the discovery that improved properties in refractory concretes of the type referred to in that patent which contain as essential components calcium silicate cement and topaz, and preferably a filler in the form of an aggregate, may be secured by the addition to such mixes of free silica in finely divided form within the limits and in the manner below specified.

The refractory concrete of the present invention, which may be employed for applications such as those mentioned in the Kocher patent, is made from a mix, the constituents of which lie within the same broad limits as those given by Kocher with the addition, however, of finely divided free silica or silica flour, i. e. quartz sand or potter's flint within the range of from 0.5 to 15.0% by weight of the total mix. The mix thus has the following composition, the components being given by per cent of the total weight of the mix:

| | Per cent |
|---|---|
| Topaz, raw or partly calcined | .426–94.6 |
| Calcium silicate cement | 4.26 –59.7 |
| Refractory filler | 0 –94.1 |
| Added free silica | 0.5 –15.0 |

It is preferred for some applications that the added silica lie within the limits 2.0 to 12.0% by weight of the total mix. In such preferred mix the components are present in the following amounts:

| | Per cent |
|---|---|
| Topaz | .440–93.0 |
| Calcium silicate cement | 4.40 –58.8 |
| Refractory filler | 0 –92.6 |
| Added free silica | 2.0 –12.0 |

The calcium silicate cement employed is one in which the predominant compounds that furnish the hydraulic strength to the mixture are calcium silicates. Examples are Portland cements, Portland-blast furnace slag cements, Portland pozzuolan cements, true pozzuolanic cements, slag cements, and natural cements.

"Portland cement" may be defined as the product obtained by pulverizing clinker consisting essentially of hydraulic calcium silicates, to which no additions have been made subsequent to calcination other than water and/or untreated calcium sulfate. The following Portland cement having the following composition, by weight, is typical:

| | Per cent |
|---|---|
| CaO | 63–65 |
| $SiO_2$ | 20–22 |
| $Al_2O_3$ | 5– 7 |
| $Fe_2O_3$ | Up to 4.5 |
| MgO, alkalies and minor constituents | Balance |

The "Portland-blast furnace slag cement," as that term is used herein, is made by grinding together Portland cement clinker and granulated blast furnace slag.

The "Portland pozzuolan cements," as that term is used herein, are produced by grinding together Portland cement clinker and either a natural or artificial pozzuolana.

The "true pozzuolanic cements," as that term is used herein, are composed of lime and granulated slag such as volcanic cinders or blast furnace slag, mixed without heating. A typical cement of this type is made by mixing hydrated lime with slag from an iron blast furnace, said slag having been quenched suddenly in water to leave the slag in a glassy non-crystalline form. The resulting lime-slag mixture is ground to a fine powder and is then ready for use.

The "slag cement," as that term is used herein, is a mixture of hydrated lime and granulated blast furnace slag. Certain additions may be added to accelerate the set.

The "natural hydraulic cements," as that term is used herein, are those made by calcining argillaceous limestones at temperatures only so high as to expel the combined $CO_2$ and $H_2O$. The calcareous portion of such argillaceous limestones may consist of $CaCO_3$ essentially, or of Ca and Mg carbonates combined in various proportions up to that represented by the mineral dolomite, $CaMg(CO_3)_2$.

By "partly calcined topaz" as used above is meant a topaz which has been heated in such manner that at least 1% by weight of its maximum original 17.4% fluorine remains in the topaz.

The refractory filler is usually in the form of a refractory aggregate which may be fire clay grog, crushed firebrick, expanded shale, olivine, fused alumina, chrome, magnesite, vermiculite, diatomaceous earth, crushed red-brick and the like, or combinations of these materials depending upon the use to which the refractory concrete is to be put.

The constituents of the mix are supplied thereto in either comminuted or granular form to allow them to be uniformly distributed throughout the mix and consequently the resulting concrete. Those constituents which form the bond are preferably finely ground to facilitate their reaction. The calcium silicate cement, for example, may be of such fineness that practically all particles will pass through a 100 mesh screen, and the topaz may be ground to any particle size. It is preferred that the added silica likewise be finely ground, for example, to a particle size comparable to that of the cement, although it is to be understood that such particle size of the added silica is capable of considerable variation. The refractory filler or aggregate may be of any desired particle size or range of particle size consistent with substantial uniformity of distribution through the resulting concrete. The particle size of the aggregate naturally will be chosen with the minimum section of the shape or structure to be made in view.

The mix may conveniently be made by mixing the calcium silicate cement, the topaz, and the added free silica in dry condition to a uniform color, the refractory aggregate being thoroughly wet down with water and then added to the mixture of the calcium silicate cement, topaz, and the added free silica. Sufficient water is added to the resulting mixture to render it workable, the amount added depending upon the manner in which the mix is to be subsequently handled in the formation of the concrete shape or structure. Thus, if the concrete is to be cast into a mold or form, particularly if the shape is intricate, the mix should be of puddling consistency. For simple shapes, so cast, less water may be used, whereas if the mix is to be tamped or vibrated into place or molded under pressure, still less water may be used. It is obvious that sufficient water should be used in all cases to develop fully the hydraulic strength of the cement and that an excess of water should be avoided. Besides the variations in modes of handling the mix above indicated, it is possible to deposit it in a mold or form or in any desired location, as for instance, in the applying of patches to existing structures, by charging the mix into a cement gun which pumps or otherwise forces it out through a discharge orifice.

After the mixture has been shaped or molded in any one of the ways above described, it is dried and then heated. Usually for bodies of large section, such as cast furnace walls, the practice follows approximately that employed in the drying and heating of newly constructed firebrick linings. The concrete may be air dried for a period of several days, after which the furnace is heated at temperatures which gradually increase up to operating temperature.

Small bodies and shapes, such as cast bricks, tiles and slabs may be kept for a time, on the order of at least seventy-two hours in a high humidity-constant temperature atmosphere, dried at a low temperature, on the order of 230° F., and then subjected to a high temperature approximating that at which the shape will be used, for example 1600-2000° F.

Concrete resulting from mixes made in accordance with the present invention after having been dried and heated as above possesses increased strength, as compared to similar concretes similarly treated, both made without topaz and added silica, in accordance with the prior art, and containing topaz but no added free silica, in accordance with the teaching of the aforementioned Kocher patent.

Such increased strength of the concrete of the present invention at room temperatures are shown by the results set out by the following Tables I and II giving the compressive strengths of 2 inch cubes made of mixtures containing the indicated percentages by weight of Portland cement topaz, refractory aggregate, and added free silica in the form of silica flour. In the making of such 2 inch test cubes the mix was made of a puddling consistency and poured into 2 inch cube molds. After being cured for seven days in a moist cabinet the cubes were dried at 230° F., fired for the indicated length of time at the indicated temperature, and were then allowed to cool. After cooling, each cube was subjected to a compressive strength test at room temperature by subjecting it to gradually increasing pressure until a point of failure of the cube was reached.

In Table I, below, the mixes employed contained Portland cement, topaz, olivine, and silica flour, whereas the mixes employed in Table II contained Portland cement, topaz, crushed firebrick and silica flour. The Portland cement in all test was ground to a size such that 11.0% remained on a 325 mesh sieve. The silica flour was ground to pass a 100 mesh sieve and the olivine and crushed firebrick ranged in particle size from ⅜ inch to dust. Each of the values given for each test in the following Tables I and II represents the average of tests on three similar 2 inch cubes. The figures under each heading in the tables represent the per cent of such material in the total batch by weight.

TABLE I

*Portland cement—Olivine aggregate*

| | Cement | Olivine | Topaz | Silica Flour | Compressive Strength lbs. per Sq. Inch Fired 4 Days at— | | |
|---|---|---|---|---|---|---|---|
| | | | | | 1,600° F. | 1,800° F. | 2,000° F. |
| | Percent | Percent | Percent | Percent | | | |
| 1 | 18.9 | 81.1 | | | 666 | 508 | 473 |
| 2 | 16.0 | 68.0 | 16.0 | | 650 | 446 | 1,694 |
| 3 | 15.7 | 66.7 | 15.7 | 1.9 | 1,028 | 542 | 1,608 |
| 4 | 15.4 | 65.6 | 15.4 | 3.8 | 1,216 | 638 | 1,975 |
| 5 | 14.8 | 63.0 | 14.8 | 7.4 | 1,820 | 1,467 | 2,096 |
| 6 | 14.3 | 60.7 | 14.3 | 10.7 | 1,796 | 1,704 | 2,479 |
| 7 | 13.8 | 58.6 | 13.8 | 13.8 | 1,909 | 1,529 | 2,350 |

TABLE II

*Portland cement—crushed firebrick*

| | Cement | Firebrick | Topaz | Silica Flour | Compressive Strength, lbs. per Sq. Inch Fired 4 Days at— | | |
|---|---|---|---|---|---|---|---|
| | | | | | 1,600° F. | 1,800° F. | 2,000° F. |
| | Percent | Percent | Percent | Percent | | | |
| 1 | 20.6 | 79.4 | | | 681 | 470 | 605 |
| 2 | 17.1 | 65.8 | 17.1 | | 1,104 | 1,892 | 2,238 |
| 3 | 16.8 | 64.3 | 16.8 | 2.1 | 1,408 | 1,975 | 2,667 |
| 4 | 16.4 | 63.1 | 16.4 | 4.1 | 1,704 | 2,725 | 3,642 |
| 5 | 15.8 | 60.5 | 15.8 | 7.9 | 2,062 | 2,771 | 4,712 |
| 6 | 15.2 | 58.2 | 15.2 | 11.4 | 2,225 | 3,196 | 4,592 |
| 7 | 14.6 | 56.2 | 14.6 | 14.6 | 2,117 | 3,750 | 4,497 |

It will be noted that Table I shows a material increase in compressive strength of olivine-Portland cement-topaz mixtures, when fired at 1600° F. and 1800° F., the strength of specimens fired at 2000° F. remaining about the same, when as little as 1.9% finely divided free silica is added to the mix. The strength of specimens fired at all three given temperatures increases, with increased added silica, until 13.8% silica is added at which point the strengths of specimens fired at 1800° F., and 2000° F. drops off slightly. It is to be understood, however, that the invention is not to be restricted to the typical specimens given by way of example, and that the invention includes the addition of from 0.5 to 15.0% by weight of the mix of finely divided free silica, the preferred range of such addition being from 2.0 to 12.0%.

Table II shows the results of adding from 2.1 to 14.6% by weight of the mix of finely divided free silica to various crushed firebrick-Portland cement-topaz mixtures. With such mixtures increases in compressive strengths over those of specimens of test No. 2, which contained no added free silica, are obtained at all temperatures of firing within the range of added free silica shown in the table. Here again, however, it should be emphasized that such mixtures are illustrative only, and that the invention includes the addition of finely divided free silica within the broad and the preferred ranges set out above to the specified mixtures containing calcium silicate cement.

The reason why refractory concretes employing calcium silicate cement and topaz with free silica added thereto in accordance with the present invention possess increased hot and cold strengths as compared to similar concretes without the added free silica is not fully understood. The theory which seems most fully to accord with the facts as now known is that the added silica which, of course, is free silica and is of the particle size such that it readily reacts with other components of the bond, is acted upon by the fluorine or HF released upon heating of the topaz to form a bond in which silica plays a large part, such silica being either silica per se in crystalline form or combined with alumina to form mullite in fine crystalline form. The improvement in strength of concretes by such addition of free silica appears most marked with aggregates containing little or no free silica.

Regardless of the correctness of such theory, it is possible to employ the present invention with concretes containing the added free silica but in which the topaz is not present in the mix, the concrete being subjected to the volatile products released by topaz when heated in proximity to the concrete. The various methods by which concrete may be subjected to such volatile products of topaz have been set out in the above identified Kocher Patent, and such methods may be practiced here in the same manner but with the exception that the mix shall contain added free silica within the defined limits. Thus the invention may be practiced, especially with smaller shapes, such as bricks, slabs, and tiles, by heating such shapes in a muffle furnace with a quantity of topaz in a crucible likewise placed in the muffle furnace. With larger shapes such as furnace walls and the like, the furnace or other part may be heated preparatory to being placed in service and thereafter subjected to the action of an atmosphere of volatile products of topaz. Such improvement in strength in refractory concrete containing calcium silicate cement, refractory aggregate, and added free silicate within the limits noted, may also be attained after the concrete has been in service by the diffusion into it at elevated temperatures of the volatile products given off by topaz when heated to at least 1400° F., such heating of the body and the topaz adjacent thereto preferably being carried out at temperatures of at least 1600° F.

Whereas particular embodiments of the invention have been described above for purposes of illustration, it will be evident that numerous variations of details are possible within the teaching of the invention. I desire to claim as new the following.

I claim:

1. A mix for forming refractory concrete comprising the following components by weight of the mix: calcium silicate cement from 4.26 to 59.7%, topaz containing from 1 to 17.4% by weight of fluorine from 0.426 to 94.6%, and silica flour from 0.5 to 15.0%.

2. A mix for forming refractory concrete comprising the following components by weight of the mix: calcium silicate cement from 4.40 to 58.8%, topaz containing from 1 to 17.4% by weight of fluorine from 0.44 to 93.0%, and silica flour from 2.0 to 12.0%.

3. A mix for forming refractory concrete comprising the following components by weight of the mix: calcium silicate cement from 4.26 to 59.7%, topaz containing from 1 to 17.4% by weight of fluorine from 0.426 to 94.6%, refractory aggregate from 1 to 94.1%, and silica flour from 0.5 to 15.0%.

4. A mix for forming refractory concrete comprising the following components by weight of the mix: Portland cement from 4.26 to 59.7%, topaz containing from 1 to 17.4% by weight of fluorine from 0.426 to 94.6%, refractory aggregate from 1 to 94.1%, and silica flour from 0.5 to 15.0%.

5. A mix for forming refractory concrete comprising the following components by weight of the mix: Portland cement from 4.40 to 58.8%, topaz containing from 1 to 17.4%, by weight of fluorine from 0.426 to 94.6%, refractory aggregate from 1 to 92.6%, and silica flour from 2.0 to 12.0%.

6. A refractory concrete formed from a mix comprising the following components by weight of the mix: calcium silicate cement from 4.26 to 59.7%, topaz containing from 1 to 17.4% by weight of fluorine from 0.426 to 94%, and silica flour from 0.5 to 15.0%.

7. A refractory concrete formed from a mix comprising the following components by weight of the mix: calcium silicate cement from 4.26 to 59.7%, topaz containing from 1 to 17.4% by weight of fluorine from 0.426 to 94.6%, refractory aggregate from 1 to 94.1%, and silica flour from 0.5 to 15.0%.

8. A refractory concrete formed from a mix comprising the folowing components by weight of the mix: calcium silicate cement from 4.40 to 58.8%, topaz containing from 1 to 17.4% by weight of fluorine from 0.44 to 93.0%, and silica flour from 2.0 to 12.0%.

9. A refractory concrete body formed from a mix comprising the following components by weight of the mix: Portland cement from 4.26 to 59.7%, topaz containing from 1 to 17.4% by weight of fluorine from 0.426 to 94.6%, refractory aggregate from 1 to 94.1%, and silica flour from 0.5 to 15.0%.

10. The method of making refractory concrete which comprises heating a body made from a mix comprising the following components by weight of the mix: calcium silicate cement from 4.26 to 59.7%, and silica flour from 0.5 to 15.0%, and subjecting such body to contact with the fluorine given off by the heating of topaz at a temperature of 1600° F.

11. The method of making refractory concrete which comprises making a mix comprising the following components by weight of the mix: calcium silicate cement from 4.26 to 59.7%, refractory aggregate up to 94.1%, and silica flour from 0.5 to 15.0%, hydrating the mix and producing therefrom a concrete body, installing such body for service, and in the initial firing of the body subjecting it to contact with the fluorine given off by topaz when heated to 1600° F.

12. The method of treating a refractory concrete body formed from a mix comprising the following components by weight of the mix: calcium silicate cement from 4.26 to 59.7%, refractory aggregate up to 94.1% and silica flour from 0.5 to 15.0%, which comprises heating said body and subjecting it to contact with the fluorine given off by topaz when heated to 1600° F.

13. The method of making refractory concrete bodies which comprises making a mix comprising the following components by weight of the mix: calcium silicate cement from 4.26 to 59.7%, topaz containing from 1 to 17.4% by weight of fluorine from 0.426 to 94.8%, refractory aggregate from 1 to 94.1%, and silica flour from 0.5 to 15.0%, hydrating the mix, forming a body from such mix, and then firing said body at a temperature of between 1600° and 2000° F.

FRANK E. LOBAUGH.

REFERENCES CITED

The following references are of record in the file of this patent:

UNITED STATES PATENTS

| Number | Name | Date |
| --- | --- | --- |
| 2,416,701 | Kocher | Mar. 4, 1947 |

Certificate of Correction

Patent No. 2,511,725                                                  June 13, 1950

FRANK E. LOBAUGH

It is hereby certified that errors appear in the printed specification of the above numbered patent requiring correction as follows:

Column 7, line 4, for "0.426 to 94.6%" read *0.44 to 93.0%*; line 10, for "94%" read *94.6%*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*